Oct. 9, 1928.

A. T. KASLEY 1,686,697

ELECTRIC LOCOMOTIVE

Filed Jan. 5, 1924

WITNESSES:
H. B. Funk
W. B. Jaspert.

INVENTOR
Alexander T. Kasley.
BY
Wesley G. Carr
ATTORNEY

Patented Oct. 9, 1928.

1,686,697

UNITED STATES PATENT OFFICE.

ALEXANDER T. KASLEY, OF ESSINGTON, PENNSYLVANIA, ASSIGNOR TO WESTINGHOUSE ELECTRIC & MANUFACTURING COMPANY, A CORPORATION OF PENNSYLVANIA.

ELECTRIC LOCOMOTIVE.

Application filed January 5, 1924. Serial No. 684,492.

My invention relates to electric railway vehicles and particularly to motor suspensions and drive mechanisms therefor.

It is among the objects of my invention to provide motor suspension means and drive mechanism for electrical railway vehicles, which shall be of simple, compact and durable mechanical construction.

It is another object of my invention to effect an equitable distribution of the weight of the vehicle and motor on the respective wheel axles.

Another object is to maintain a state of equilibrium of the co-operating driving elements by effectively counter-balancing the reaction at the axes of the driving and driven axles.

In electrical railway vehicles, the driving motors are commonly spring-borne on the transom or cross-members of the vehicle frame and journalled at one end upon the driven axles, to which the motor shafts are geared. In this type of mounting approximately half of the weight of the motors is spring-borne on the frame and the remaining weight is "dead" upon the axles, which is a very undesirable service condition. Furthermore, the direct connection of the motor shaft by gear trains to the driven axles has a tendency to react upon the driven axles, during acceleration of the motors, thereby decreasing the adhesion to the rails.

My present invention is directed to a railway vehicle embodying a motor suspension and drive mechanism that obviates these difficulties. I propose to design the main frame of the vehicle so as to be spring-borne on the driven axles with the driving motors rigidly secured to the frame. Each of a plurality of side arms has one end journalled upon the wheel axles and the other end spring-borne on the motor housing or frame, these arms having an idler shaft journalled therein equidistant from the driven axle and the point of suspension on the motor housings.

Gear-wheels are mounted on the driven, idler, and motor shafts, respectively, in cooperative engagement with each other, and the gear-wheels of the driven axles are provided with a universal connection to their supporting hubs, to provide constant and positive engagement of the co-operating gear teeth, irrespective of the disposition of the corresponding axle and driven shaft axis.

Figure 1:
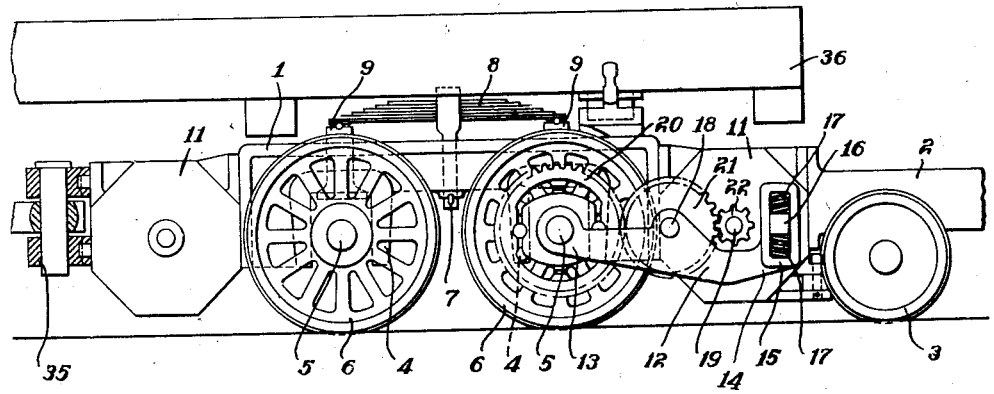
Figure 2:
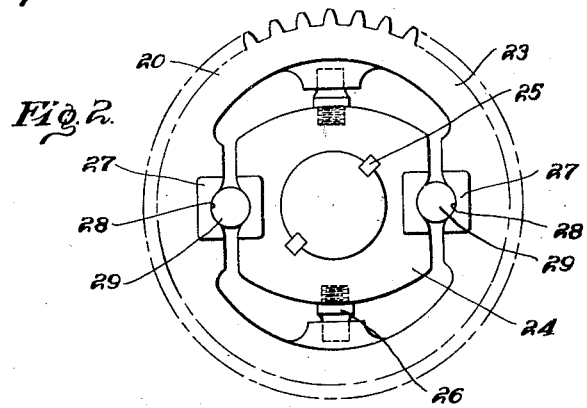
Figure 3:
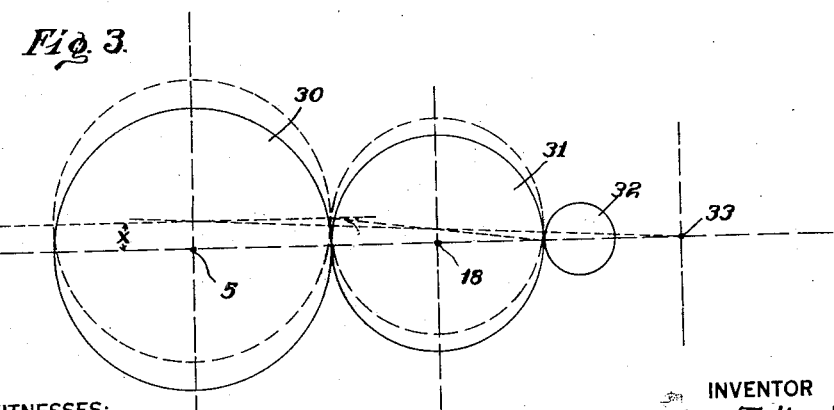

In the accompanying drawing, constituting a part hereof, and in which like reference characters designate like parts, Figure 1 is a side elevational view of a portion of a railway vehicle embodying the principles of my invention, Fig. 2 is a side elevational view of the gear-wheel mounted on the driven axles, and Fig. 3 is a schematic view of the co-operating gear-wheels, illustrating their space relation and respective center distances.

Referring to Fig. 1, the structure herein illustrated comprises the usual side frames 1 having an end sill 2 slightly lowered to facilitate engagement with a guide truck 3. The side frames 1 have the usual vertical pedestal jaws 4, which are adapted to receive journal boxes engaging the wheel axles 5, on which driver wheels 6 are secured at the respective ends thereof.

The frame member 1 is suspended from straps or links 7 that are suspended from the drive springs 8, which rest upon spring saddles 9 that are supported by the journal boxes of the wheel axles 5. It will be noted that the weight is equalized on the axles and that the frame is resiliently supported thereon.

A plurality of driving motors 11 are rigidly secured to the respective ends of the frame 1. A plurality of side arms or yokes 12 one on each side of the truck are respectively journalled at their ends 13 to the corresponding axles 5, only one side arm being shown and their other ends 14 are expanded and provided with elongated openings 15, which are adapted to co-operatively engage lugs 16 that project from the frame of the corresponding motor 11.

A plurality of helical springs 17 are interposed between the motor lugs 16 and the horizontal walls of the openings 15. Idler shafts 18 are journalled in the side arms 12, equidistant from the axis of the axle 5 and the center line of the motor lug 16. The axle 5, idler shafts 18 and motor shaft 19 are provided with co-operatively engaging gear-wheels 20, 21 and 22, respectively.

The gear-wheel 20 (Fig. 2) comprises a rim member 23 and a hub member 24, the latter being secured on the ends of the driven axles by keys 25, and a pair of trunnions 26 are secured to the hub 24 to permit pivotal engagement with the rim 23. A plurality of ball-and-socket joints 27, comprising seats 28 in the rim and hub respectively and ball bearings 29, are arranged at right angles to the trunnions to co-operate with the latter for the purpose of providing a certain degree of universal movement of the hub with respect to the gear rim.

The object of the universal joint with the drive gear is to permit misalinement of the driven axle and the idler shaft 18 without interrupting the proper gear tooth engagement.

The object of the gear mounting and particularly the function of the side arms 12 may be more clearly set forth with reference to Fig. 3, where the circle 30 represents the driven gear 20, 31, the idler gear 21, 32, the motor pinion 22, and 33, represents the point of suspension of the arm 12 on the motor frame lug 16.

The distance between the axes corresponding to the members 5 and 18, and 18 and 33 are equal, whereby the reaction of the motor on the driven axle 5 is equal and in the same direction as the reaction at the point of suspension 33, while the reaction at the axis of the shaft 18 is in an opposite direction, to thus counterbalance the reactions on the driven axle and motor, whereby the side arms 12 are maintained in a state of equilibrium.

Furthermore, this construction permits of vertical displacement of the driven axle 5 without disturbing the engagement of the gear-wheels, since, as is seen in Fig. 3, the vertical displacement of the axle 5 represented by X is considerably reduced at the axis of the shaft 18 and is practically zero at the motor pinion 22, represented by the circle 32.

This is a very desirable feature, as it permits of raising and lowering the driven axles to conform to irregularities of the rail without changing the rotational velocity of the armature or disturbing the mounting of the drive mechanism and also without applying impacts or undue strains to the more sensitive and delicate parts of the driving motor.

The inner or rear end of the frame 1 is provided with a hinged mechanism 35 for coupling with a similar truck structure, the two structures jointly constituting the support for the vehicle body 36. The rear motor 11 is shown disconnected for the purpose of clearness of illustration, but in practice, it is associated with its co-operating driven axle by a yoke and intermediate drive gear connection in identically the same manner as that illustrated at the front end of the vehicle.

It is evident from the above description that a railway vehicle, designed and constructed in accordance with my invention, will provide an efficient and rugged drive mechanism possessing many desirable features that are distinct advances over the prior art.

Although I have described a specific embodiment of my invention, it will be obvious to those skilled in the art that various modifications and changes may be made in the details of construction, in the size and proportion of the several co-operating parts and in the types of gear elements utilized without departing from the principles herein set forth.

I claim as my invention:

1. In a vehicle, the combination with a plurality of wheel axles and a frame journalled thereon, of a motor secured to said frame, side arms journalled at one of their ends on one of said axles and spring-borne at their other ends on the motor frame, idler shafts journalled for rotation in said arms, and co-operating gear-wheels mounted on the ends of one of the axles and on the idler and motor shafts.

2. In a vehicle, the combination with a plurality of wheel axles and a frame spring-borne thereon, of a motor secured to said frame, side arms journalled at one of their ends to one of said axles and at their other ends on the motor frame, idler shafts journalled for rotation in said arms, and co-operating gear-wheels mounted on the ends of one of the axles, and on the idler and motor shafts, some of said gear wheels being mounted for universal movement on their supporting hubs.

3. In a vehicle, the combination with a plurality of wheel axles and a frame spring-borne thereon, of a plurality of motors secured to said frame, side arms journalled at one of their ends to one of said axles and spring-borne at their other ends on the motor frames, idler shafts journalled for rotation in each of said arms, and co-operating gear wheels mounted on said idler shafts and on the ends of one of the axles and of the motor shaft, the gear wheels of the driven axle being mounted for universal movement on their supporting hubs.

4. In a vehicle, the combination with a plurality of wheel axles and a frame spring-borne thereon, of a plurality of motors secured to said frame, side arms journalled at one of their ends to one of said axles and spring-borne at their other ends on the motor frames, idler shafts journalled for rotation in said arms, and co-operating gear-wheels mounted on the idler shafts and on the ends of one of the axles and of the motor shaft, the gear-wheels of the driven axle being mounted for universal movement on their supporting hubs and said side arms being adapted to maintain a fixed center distance of said gear-wheels.

5. In a vehicle, the combination with a plurality of wheel axles, and a frame spring-borne thereon, of a plurality of motors secured to said frame, side arms journalled at one of their ends to one of said axles and spring-borne at their other ends on the motor frames, idler shafts journalled for rotation in said arms, co-operating gear-wheels mounted on the idler shafts and on the ends of one of the axles and of the motor shaft, the gear-wheels of the driven axle being mounted for universal movement on their supporting hubs, said side arms being adapted to maintain a fixed center distance of said gear wheels and to maintain them in a state of equilibrium.

6. In a vehicle, the combination with a plurality of wheel axles and a frame springborne thereon of gear wheels mounted for universal movement on one of said axles, motors secured to said frame, side arms journalled at one of their ends on one of said axles and resiliently supported at their other ends on the motor frames, idler shafts journalled for rotation in each of said arms equidistant from the axis of one of said axles and the point of suspension of said arms on the corresponding motor frame, gear-wheels mounted on said idler shafts in co-operative engagement with the corresponding axle gear wheels and co-operating pinions, secured to the motor shafts.

7. In a vehicle, the combination of a plurality of wheel axles and a frame supported thereon, a motor secured to said frame, a gear wheel on one of said axles, a side arm journalled at one end on said axle and resiliently supported at its other end on said frame, a pinion on said motor, and an idler gear wheel meshing with the gear wheel on the axle and a pinion on said motor, said idler gear wheel being journalled in said side arm at a point substantially half way between said axle and the point of support on said frame.

8. A railway vehicle comprising a driven wheel axis, a frame resiliently mounted on the wheel axle, a motor for driving the wheel axle mounted in the frame, a gear wheel mounted on the axle, a side arm journalled on the axle at one end and resiliently supported on the frame at its other end, an idler gear wheel journalled in the side arm in engagement with the gear wheel and a pinion on the motor for engaging the idler gear wheel.

9. In a vehicle drive mechanism, a driven axle, a frame resiliently supported on the axle, a driving motor having a pinion mounted in the frame, a side arm journalled at one end on the axle and spring supported at its other end on the frame, an idler gear wheel journalled in the side arm substantially midway between its ends and in engagement with the pinion on the motor and a gear wheel mounted on the axle for engaging the idler gear wheel.

In testimony whereof, I have hereunto subscribed my name this 29th day of December, 1923.

ALEXANDER T. KASLEY.